US008379374B2

(12) United States Patent
Keegan

(10) Patent No.: US 8,379,374 B2
(45) Date of Patent: Feb. 19, 2013

(54) BUS TO BUS POWER INTERCONNECT

(75) Inventor: Jeremy J. Keegan, Kewaskum, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 220 days.

(21) Appl. No.: 12/837,644

(22) Filed: Jul. 16, 2010

(65) Prior Publication Data

US 2012/0017021 A1 Jan. 19, 2012

(51) Int. Cl.
*H02B 1/20* (2006.01)

(52) U.S. Cl. ........ 361/637; 361/624; 361/648; 439/213; 439/507; 710/306; 174/68.2; 174/99 B

(58) Field of Classification Search .................. 361/605, 361/611, 615, 624, 637–639, 648–651
See application file for complete search history.

(56) References Cited

U.S. PATENT DOCUMENTS

| | | | | | |
|---|---|---|---|---|---|
| 5,698,898 | A | * | 12/1997 | Matsumoto | 257/712 |
| 5,876,224 | A | * | 3/1999 | Chadbourne | 439/110 |
| 6,069,321 | A | * | 5/2000 | Wagener et al. | 174/99 B |
| 6,111,745 | A | * | 8/2000 | Wilkie et al. | 361/605 |
| 6,205,017 | B1 | * | 3/2001 | Wilkie et al. | 361/605 |
| 6,234,842 | B1 | * | 5/2001 | Keay et al. | 439/620.24 |
| 6,270,361 | B1 | * | 8/2001 | Onizuka et al. | 439/76.2 |
| 6,381,122 | B2 | * | 4/2002 | Wagener | 361/611 |
| 6,435,888 | B1 | * | 8/2002 | Reed, Jr. | 439/213 |
| 6,489,567 | B2 | * | 12/2002 | Zachrai | 174/149 B |
| 6,781,818 | B2 | * | 8/2004 | Josten et al. | 361/611 |
| 6,870,103 | B1 | * | 3/2005 | Wiant et al. | 174/68.2 |
| 7,449,635 | B2 | * | 11/2008 | Wiant | 174/68.2 |
| 7,558,053 | B2 | * | 7/2009 | Moore et al. | 361/611 |
| 7,826,231 | B2 | * | 11/2010 | Yamabuchi et al. | 361/775 |
| 2003/0096541 | A1 | * | 5/2003 | Onizuka et al. | 439/876 |
| 2009/0004888 | A1 | * | 1/2009 | Soga et al. | 439/43 |
| 2010/0085687 | A1 | * | 4/2010 | Shannon et al. | 361/624 |

* cited by examiner

*Primary Examiner* — Courtney Smith
(74) *Attorney, Agent, or Firm* — Fletcher Yoder, P.C.; Alexander R. Kuszewski; John M. Miller

(57) ABSTRACT

A bus interconnect in accordance with present embodiments includes a via block having first and second interfaces separated by a conductive body, wherein the via block is configured to communicatively couple with a first bus through the first interface and wherein the conductive body is configured to extend through an opening in a bus support panel. A first coupling section of the jumper includes a first attachment feature, wherein the first attachment feature is configured to facilitate attachment with the second interface of the via block. A neck section of the jumper extends perpendicularly from the first coupling section, and a second coupling section of the jumper extends perpendicularly from the neck section in parallel with the first coupling section. The second coupling section includes a second attachment feature configured to facilitate attachment with a second bus. The first coupling section and the second coupling section each extend away from the neck section in different directions.

25 Claims, 8 Drawing Sheets

BUS TO BUS POWER INTERCONNECT

BACKGROUND

The present invention relates generally to the field of power electronic devices such as those used in power conversion or applying power to motors and similar loads. More particularly, the invention relates to an interconnect feature capable of communicatively coupling electrical distribution buses and associated systems and methods.

In the field of power electronic devices, a wide range of circuitry is known and currently available for transmitting, converting, producing, and applying power. Depending upon the application, such circuitry may transmit incoming power to various devices and/or convert incoming power from one form to another as needed by a load. For example, in a drive system, circuitry may be utilized to take power from a high voltage electrical grid and convert it for use with a high horse power motor or the like. Alternatively, circuitry may be utilized to simply distribute power to different devices. Circuitry for providing such functionality is often packaged together. Indeed, electrical systems with packaged electrical and electronic components, such as drive cabinets and motor control centers, are known and in use. For example, motor control centers (MCCs) are used for power and data distribution in large industrial operations, and drive cabinets are used for power conversion and distribution. In a typical MCC and/or drive cabinet a variety of components are housed in large electrical enclosures that may be subdivided into compartments. For example, an MCC may include components such as switchgear, semiconductor power electronic circuits, programmable logic controllers (PLCs), motor controllers, and so forth. A drive cabinet may include a rectifier (converter), an inverter, transitional attachments, and so forth. Further, such electrical enclosures may include bus work that communicatively couples the components with a power source and/or other components. Many systems utilize both MCC and drive cabinets together.

Typically, MCC cabinets are connected to a main power line via an MCC bus. For example, an MCC bus is typically communicatively coupled to a power source (e.g., a grid that provides three-phase AC power or a DC power source) so that the MCC bus can provide power to the various devices and features disposed along the MCC bus. Drive systems that are utilized in conjunction with such an MCC also require access to the main power. However, since the MCC bus is typically already connected to the power grid, it is generally more efficient to transmit the power from the MCC bus to the drive system via a drive system bus. The MCC bus typically passes through the drive cabinet, which facilitates coupling between the MCC bus and the drive system bus. However, the MCC bus also typically extends along a cabinet panel that supports the MCC bus and substantially separates the MCC bus from drive cabinet features. Accordingly, traditional connections between an MCC bus and a drive bus include cabling or the like that extend over the paneling from the MCC bus to the drive bus. It is now recognized that such connections can be inefficient and cumbersome. Further, it is now recognized that more efficient, accessible, and tidy mechanisms for bus to bus interconnection are desirable.

BRIEF DESCRIPTION

Embodiments in accordance with present techniques are directed to a bus to bus interconnect that facilitates communicative coupling of a plurality of bus structures, such as an MCC bus and a drive system bus disposed within an electrical enclosure. A bus interconnect in accordance with present embodiments includes a via block having first and second interfaces separated by a conductive body, wherein the via block is configured to communicatively couple with a first bus through the first interface and wherein the conductive body is configured to extend through an opening in a bus support panel. The interconnect also includes a jumper with a first coupling section, a second coupling section, and a neck section. The first coupling section of the jumper includes a first attachment feature, wherein the first attachment feature is configured to facilitate attachment with the second interface of the via block. The neck section extends perpendicularly from the first coupling section, and the second coupling section extends perpendicularly from the neck section in parallel with the first coupling section. The second coupling section includes a second attachment feature configured to facilitate attachment with a second bus. The first coupling section and the second coupling section each extend away from the neck section in different directions.

Embodiments in accordance with present techniques are directed to a multiple-bus system with at least one interconnect communicatively coupling multiple buses. The multiple bus system includes a first bus that includes a first connection feature. The first bus is positioned adjacent a panel on a first side of the panel. A second bus, which is aligned in parallel with the first bus, is positioned on the opposite side of the panel. The second bus comprises a second connection feature that is offset from the first connection feature by a distance in a direction traverse to the length of the first and second bus. The interconnect includes a via block and a jumper. The via block has first and second interfaces separated by a conductive body, wherein the first interface is communicatively coupled with the first connection feature and wherein the body extends through an opening in the panel. The jumper is coupled to the second interface via a first bracket arm and a first fastener feature positioned through the first bracket arm. A trunk portion of the jumper extends perpendicularly from an edge of the first bracket arm and adjacent a width of the second bus. A second bracket arm of the jumper extends perpendicularly from an edge of the trunk portion and adjacent a face of the second bus, wherein the second bracket arm is coupled with the second bus via the second connection feature and a second fastener feature positioned through the second bracket arm.

Embodiments in accordance with present techniques are directed to a method of transmitting current from a first bus to a second bus. The method includes transmitting current from a first bus through a via block that is coupled to the first bus and extends perpendicularly from the first bus through a panel to a jumper. The method also includes receiving the current into the jumper via a first bracket arm and first attachment features coupled to the via block, transmitting the current from the first bracket arm to a second bracket arm via a jumper neck that extends perpendicularly away from the first bracket arm adjacent a width of a second bus bar, and transmitting the current into the second bus bar via the second bracket arm and second attachment features that interlock with grooves disposed in a face of the second bus bar.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a bus system that facilitates power sharing between buses within an electrical enclosure, such as an MCC or drive cabinet. In particular, the present technique provides an interconnect that facilitates communicative coupling of a first bus (e.g., a drive system bus) with a second bus (e.g., a motor control center bus) through a panel within the electrical enclosure. The interconnect includes a via block and a jumper that cooperate to connect the buses through the panel in an offset manner that facilitates access to coupling features (e.g., bolts and bolt holes that pass through the jumper and engage the via block or bus) from a front of the enclosure. The interconnect may include coupling features that cooperate with grooves disposed in one or more of the extruded bus bars. The bus bars may include ridges extending from opposite edges of a body and at least a pair of grooves disposed in a face of each bus bar. Such grooves and ridges may facilitate maneuverability and configuration of the bus systems, and facilitate coupling of the interconnect with the bus bars at any point along the bus bars.

References in the specification to "one embodiment," "an embodiment," or "an exemplary embodiment," indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, geometric references are not intended to be strictly limiting. For example, use of the term "perpendicular" doe not require an exact right angle, but defines a relationship that is substantially perpendicular, as would be understood by one of ordinary skill in the art.

Figure 1:
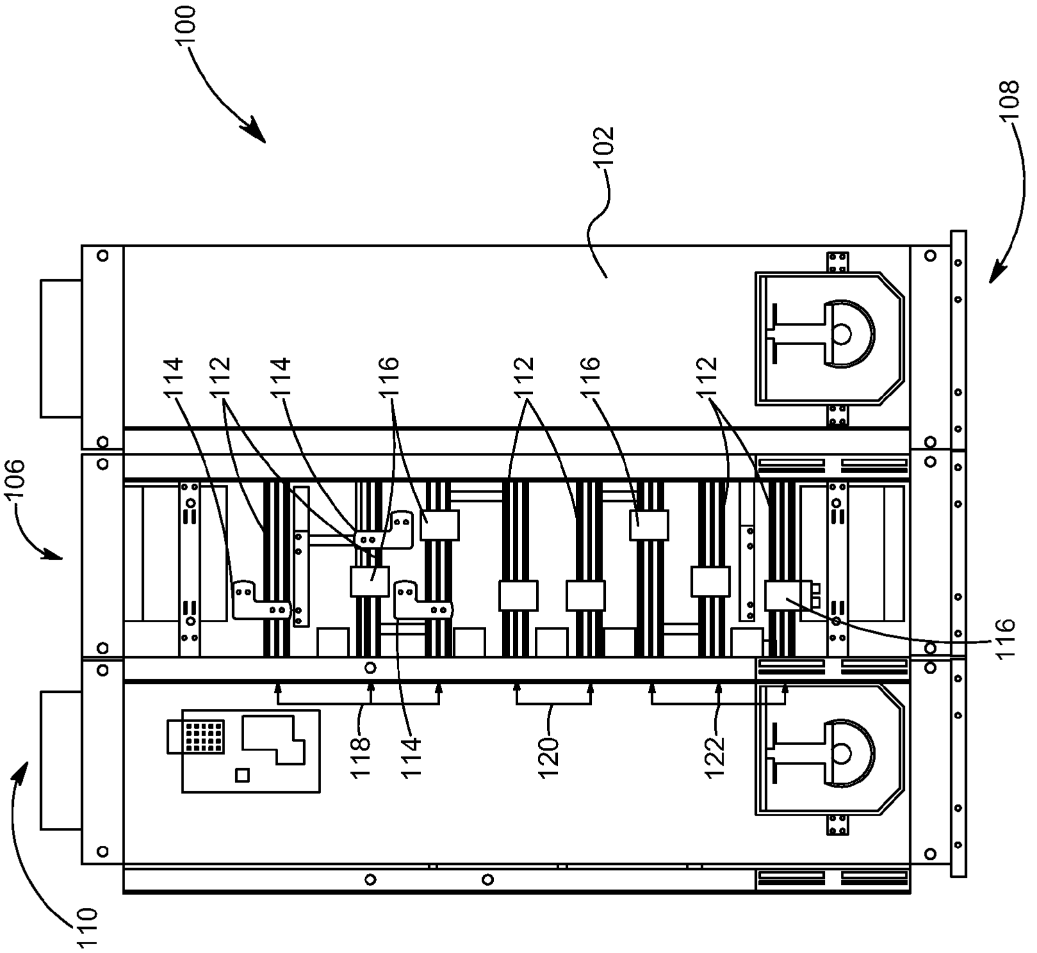
FIG. 1 is a front view of an electrical enclosure including a multi-bus system in accordance with present embodiments.

Turning now to the drawings and referring to FIG. 1, an electrical enclosure 100 is illustrated in which electrical components of various types may be housed and connected via a bus system that includes bus bars, connection features, and a support system. The enclosure 100 may be representative of a motor control center or other industrial, commercial, or marine electrical system. In general, the enclosure 100 provides a protective shell around various electrical components and the bus system. For example, the enclosure 100 may include a shell 102 made of any suitable material, such as heavy gauge sheet metal, reinforced plastic, and so forth. Further, the enclosure 100 may include devices such as a programmable logic controller, switches, motor controls, inverters, rectifiers, and so forth disposed along and/or coupled with the bus system. Specifically, in the illustrated embodiment, the enclosure 100 includes a wiring bay section 106 positioned between a pair of power drive sections 108, 110.

A set of bus bars 112 passes along a panel of the enclosure 100 and through each of the enclosure sections (i.e., the wiring bay section 106 and each of the drive sections 108, 110). Behind the bus bars 112 is a support panel, and an MCC bus system (not shown) including three MCC bus bars is positioned behind the support panel. The MCC bus system passes along the support panel in parallel with the bus bars 112. Each of the three bus bars of the MCC bus system couples with one of the bus bars 112 through interconnects 114 that extend through the panel. Accordingly, the MCC bus is capable of transmitting electrical power through the support panel via the interconnects 114 to the bus bars 112. This is more efficient than traditional methods of extending cable or the like over the top of the panel or around the sides of the panel.

The bus bars 112 are made of conductive material (e.g., copper or aluminum) that has been extruded to a desired length for use with the enclosure 100. Additionally, as will be discussed in detail below, the bus bars 112 are extruded with certain cross-sectional features that facilitate communicatively coupling the bus bars 112 with expansion or attachments features 116 and devices, such as the interconnects 114. These cross-sectional features also facilitate cooperation with a support system that couples the bus bars 112 to the enclosure 100 and provides flexibility in configuration of the bus system (e.g., expansion of bus bar capacity) without requiring substantial changes in the bus system. Indeed, each of the bus bars 112 is held in place within the enclosure 100 with a support system that includes bus support brackets that are formed or molded from a thermalset glass reinforced material or a non-conductive material to coordinate with aspects of the cross-sectional features. Specifically, as will be discussed in further detail below, the support brackets each include openings into which one of the bus bars 112 can slide. Each support bracket includes a main opening with slots that correspond to cross-sectional features of the bus bars 112 such that the bus bars 112 can be retained without being fastened to the brackets. In some embodiments, end caps or the like may be positioned near or around the ends of the bus bars 112 such that the bus bars 112 can essentially float within the brackets without substantial lateral sliding. This flexibility facilitates attachment to features, such as the interconnects 114, by allowing slight movement of the bus bars 112 within the enclosure 100.

During operation of the illustrated embodiment, the MCC bus system receives power (e.g., three-phase AC power) from a source (e.g., an electrical grid) and distributes the power to various devices, including the drive systems 108, 110. This distribution from the MCC bus to the drive systems 108, 110 is achieved by a communicative coupling between the MCC bus system and the drive bus system. Specifically, the interconnects 114 transmit power from the MCC bus to an upper three bus bars 118 of the set of bus bars 112. As a group, the set of bus bars 112 receive and transmit the power to various components within the enclosure 100. Different groupings of the bus bars 112 are coupled to different features within the enclosure, and, thus, perform different tasks. Indeed, the upper three bus bars 118, middle two bus bars 120, and lower three bus bars 122 of the set of bus bars 112 may each perform a different function.

Figure 2:
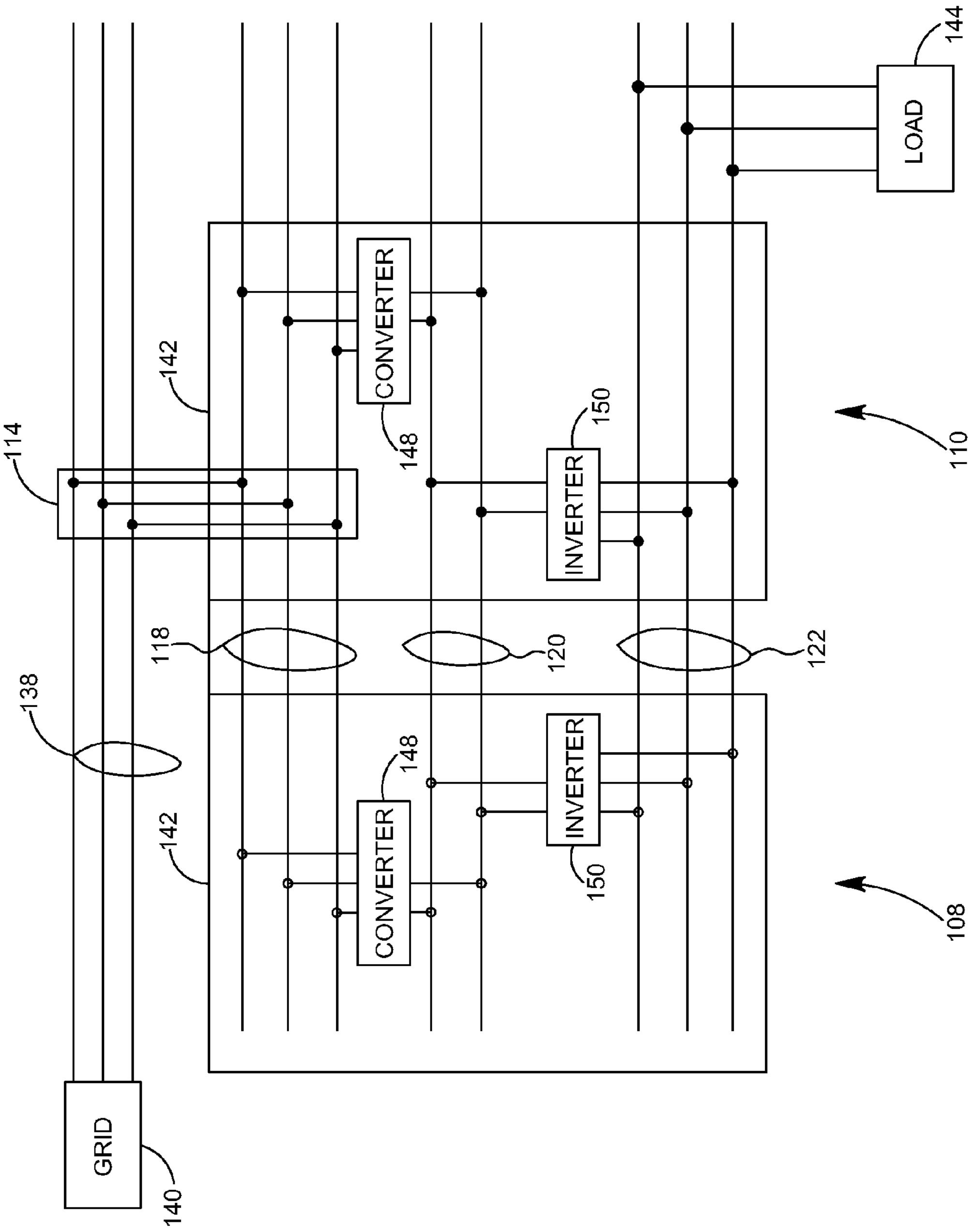
FIG. 2 is a block diagram of a pair of drive systems utilizing a motor control center bus and a drive system bus communicatively coupled via an interconnect in accordance with present embodiments.

As illustrated in FIG. 2, an MCC bus 138 and the bus bars 112 function together to provide three-phase AC power from an electrical grid 140 to drive systems 142 of the drive sections 108, 110. The drive systems 142, in turn, provide three-phase power at a desired level for a particular load 144, such as a motor. That is, the MCC bus 138 and/or the drive bus 112 function to transmit power to the drive systems 142 at a voltage and frequency of the grid 140, transmit power within the drive systems 142 as direct current, and transmit power out of the drive systems 142 to the load 144 at a desired voltage and frequency for the load 144. Specifically, as illustrated by the block diagram in FIG. 2, the MCC bus 138 receives three-phase AC power from the electrical grid 140 and transmits that power to the upper three bus bars 118 via the interconnects 114. The upper three bus bars 118, which may be referred to as drive input bus bars 118, are coupled to the interconnects 114 and a rectifier or converter 148 of each drive system so that three-phase AC power from the grid 140 is provided to the drive systems 142. In some embodiments, the three-phase AC power from the grid 140 may also be provided to other components within or related to the enclosure 100. Once the three-phase AC power is provided to the rectifier or converter 148 within each of the power drive sections 108, 110, the rectifiers 148 convert the three-phase AC power to DC power, which is then transmitted to an inverter 150 in each of the power drive sections 108, 110 via the middle two bus bars 120. Accordingly, the middle two bus bars 120 may be referred to as DC bus bars 120. The inverters 150 receive the DC power from the DC bus bars 120 and convert it to three-phase AC power that is appropriate for the load 144 via inverter circuitry, which typically includes several high power switches, such as a drive circuit and insulated-gate bipolar transistors (IGBTs). This output power is then provided to the load via the lower three bus bars 122, which may be referred to as load bus bars 122.

As set forth above, the bus bars 112 provide power to various different components of the drive systems 142 and other features. This is achieved, in accordance with present embodiments, by communicatively coupling the various devices to the bus bars 112 via attachment or connection features 116. The connection features 116 interlock with grooves in the bus bars 112 via bus clamps or the like. Due to the nature of the grooves in the bus bars 112, the connection features 116 can generally slide along the bus bars 112 and secure to any location along the bus bars 112 such that the connection features 116 can easily be positioned for connection with a device, power source, or the like. The interconnects 114 can also couple with the bus bars 112 in this manner. This facilitates power transmission from the MCC bus bars 138 to the bus bars 112 via the interconnects 114, and from the bus bars 112 to the devices via the connection features 116. For example, each of the drive input bus bars 118 is coupled with a one of the MCC bus bars 138 via a one of the interconnects 114. Thus, power from the grid 140 is transmitted from the MCC bus bars 138 to the drive input bus bars 118 via the interconnects 114. In turn, the drive input bus bars 118 provide power to other devices via the connection features 116. Accordingly, present embodiments efficiently provide power throughout the enclosure 100.

Figure 3:
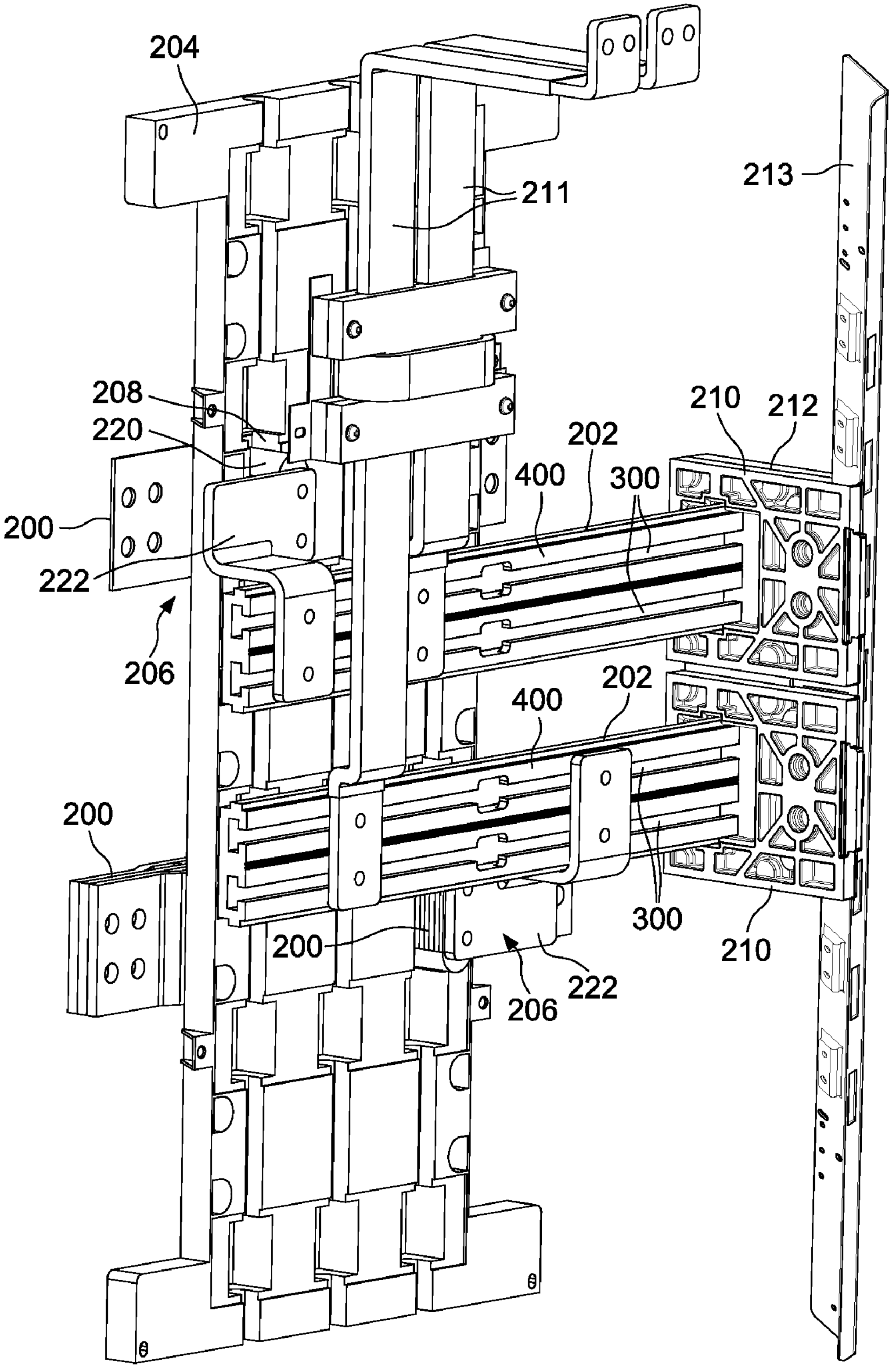
FIG. 3 is a perspective view of MCC bus bars coupled to drive bus bars positioned on opposite sides of a support panel via interconnects in accordance with present embodiments.

FIG. 3 is a perspective view of MCC bus bars 200 coupled to drive bus bars 202 positioned on opposite sides of a support panel 204 via interconnects 206 in accordance with present embodiments. In the illustrated embodiment, the MCC bus bars 200 are configured to transmit DC power. However, in other embodiments, the MCC bus bars 200 may be configured to transmit three-phase AC power. Each of the interconnects 206 passes through an opening 208 in the support panel 204 to connect with the respective bus bars 200, 202 so that cabling or the like is not required to extend over and vertically along both sides of the support panel 204 or around the sides of the support panel 204, which may require a wiring bay. It should also be noted that FIG. 3 illustrates the drive bus bars 202 being retained by support brackets 210 and coupled to linkage extensions 211 in accordance with present embodiments. The brackets 210 cooperate with an end cap 212 and a support feature 213 to stabilize the bus bars 202 within an enclosure. The linkage extensions 211 may communicatively couple the drive bus 202 with devices positioned a vertical and/or horizontal distance away from the drive bus 202 within the enclosure, such as a pre-charge device or a rectifier.

In the illustrated embodiment, the drive bus bars 202 are extruded metal and can be extruded to a desired length for an application. The MCC bus bars 200 are illustrated as essentially flat strips of metal with bolt holes disposed therein for coupling. However, in other embodiments, the MCC bus bars 200 can also be extruded like the drive bus bars 202. Further, the MCC bus bars 200 and the drive bus bars 202 can be extruded such that particular cross-sectional characteristics are included in a face of the bus bars and along the sides of the bus bars. These cross-sectional characteristics, as will be discussed below, facilitate installation of the bus bars and attachment with the bus bars in accordance with present embodiments. Further, different metals may be used for the extrusion to provide different functionality. For example, depending on the level of power being transmitted, the bus bars 200, 202 may be extruded from aluminum or copper.

Figure 4:
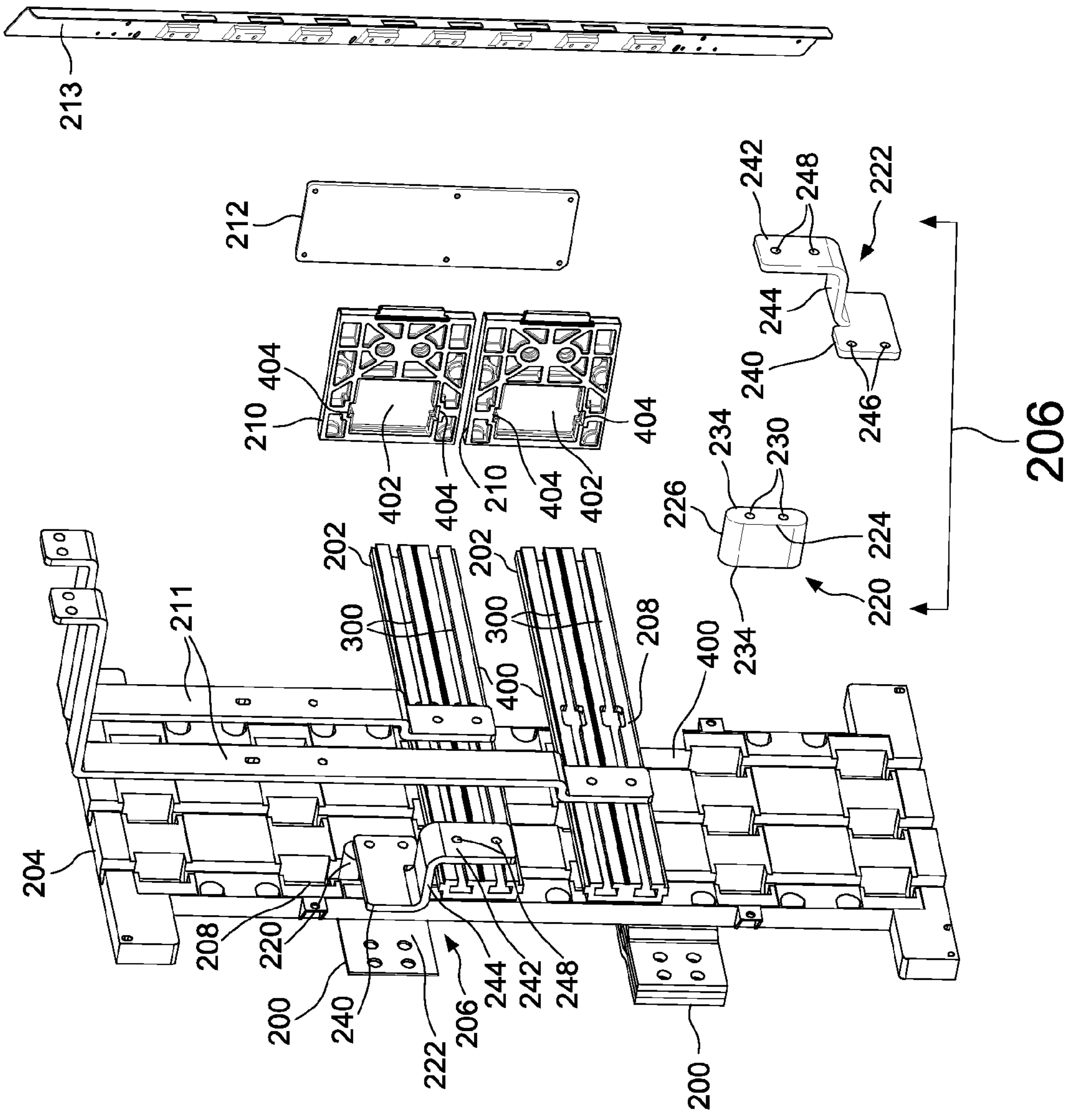
FIG. 4 is an exploded perspective view of the features illustrated in FIG. 3.

The interconnects 206 each include a via block 220 that extends through the panel 204 to couple with the MCC bus 200, and a jumper 222 that connects the via block 220 with the drive bus 202. The features of the interconnects 206 are more clearly illustrated in FIG. 4, which is an exploded view of FIG. 3. As can be seen in FIG. 4, the via blocks 220 include interfaces or coupling regions 224, which are substantially planar faces with integral attachment features on either side of a conductive body 226. Each of the interfaces 224 is configured to couple with a bus bar or the jumper 222. For example, in the illustrated embodiment, one of the interfaces 224 is communicatively coupled with the MCC bus 200 and the other interface 224 is coupled with the jumper 222. In some embodiments, both of the interfaces 224 include coupling features 230 (e.g., bolt holes) that are identical so that either interface 224 can couple with either a bus or the jumper 222. In other embodiments, the interfaces 224 are specifically configured for connection to a bus or the jumper 222. Further, the interfaces 224 may include one or more different types of coupling features 230. For example, in the illustrated embodiment, the interfaces 224 include bolt holes that extend into the body 226 and cooperate with bolts to couple with the MCC bus 200 and the jumper 222. In other embodiments, the via block 220 may include integral bolts that extend away from the via block 220 as part of the interfaces 224. It should be noted that the features of the interconnects 206 are arranged to facilitate access to the coupling features 230. For example, an installer can easily torque bolts within the coupling features 230 from a front side because the jumper 222 is configured to offset the coupling features 230.

While other embodiments may include different characteristics, the illustrated via block 220 is molded, extruded, or otherwise formed such that it has an obround cross-section. That is, the perimeters of the interfaces 224 and the body 226 of the via block 220 are obround. This shape eliminates sharp corners that can cause damage. Further, the rounded edges facilitate insertion of the via block 220 into the opening 208 without snagging corners on the edges of the opening 208 and so forth. The body 226 of the via block 220 passes through the opening 208 in the bus support panel 204 such that the via block 220 extends through either side of the panel 204. That is, the length of the via block 220 is such that it can pass through the width of the panel 204 and couple with both the MCC bus 200 and the jumper 222 without wasting cabinet space. Further, the via block 220 may function as a support mechanism for holding the MCC bus 200 and the drive bus 202 in place within the cabinet once connected. Indeed, the interaction between the via block 220 and the panel 204 may function to hold the bus bars 200, 202 in place.

As set forth above, the interconnect 206 also includes the jumper 222, which couples with the via block 220 and the drive bus 202. The jumper 222 includes a conductive bracket that may be formed from a single piece of flat metal (e.g., stamped sheet metal) such that it has different sections that provide offset attachment features. Specifically, the jumper 222 includes a first coupling section or bracket arm 240, a second coupling section or bracket arm 242, and a neck section or trunk 244. The first coupling section 240 includes a first attachment feature 246, and the second coupling section 242 includes a second attachment feature 248. The first attachment feature 246 is configured to facilitate attachment with one of the interfaces 224 of the via block 220, and the second attachment feature 248 is configured to facilitate attachment with the drive bus 202. In the illustrated embodiment, the first attachment feature 246 includes a pair of bolt holes that are disposed near an edge of the first coupling section 240 and away from an interface between the first coupling section 240 and the neck section 244. Similarly, the second attachment feature 248 includes a pair of bolt holes in the illustrated embodiment. However, different types of attachment features may be used, such as integral bolts or clamps. The neck section 244 extends perpendicularly from the first coupling section 240, and the second coupling section 242 extends perpendicularly from the neck section 244 in parallel with the first coupling section 240.

Various portions of the jumper 222 are offset from one another to facilitate access to the attachment features 246, 248. For example, the first coupling section 240 extends away from the second coupling section 242 such that the first attachment feature 246 is not obstructed by the second coupling section 242 when viewed from the front. Thus, the jumper 222 is configured such that the first attachment feature 246 is accessible to an installer from a direction perpendicular to a face of the first coupling section 240. In other words, the installer can easily access the first attachment feature 246 through the front of the enclosure in which the interconnect 206 is installed. More specifically, in the illustrated embodiment, the lengths of the first coupling section 240 and the second coupling section 242 are perpendicular to one another such that, when viewed from the front, the jumper 222 has a general L-shape. This arrangement functions to offset the first attachment feature 246 from the second attachment feature 246. This offsetting is exaggerated by positioning the first attachment feature 246 toward a side of the first coupling section 240 away from the interface between the neck section 244 and the first coupling section 240. Further, the neck section 244 offsets the first and second coupling sections 240, 242, which each extend away from the neck section 244, such that the jumper 222 has a generally Z-shaped cross-section traverse to the plane of the neck section 244. This offset provides space between the panel 204 and the second coupling section 242 when the jumper 222 is installed, and enables the second coupling section 242 to overlap the drive bus 202. Indeed, the neck sections 244 may be defined such that is substantially corresponds to a distance between the interface 224 extending beyond the panel 204 and a face of the drive bus 202.

In the illustrated embodiment, the second attachment feature 248 is configured to couple with grooves 300 in the drive bus 202. In some embodiments, both attachment features 246, 248 are capable of coupling with the grooves 300. As better illustrated by FIG. 5, the grooves 300 have a cross-section that includes a narrow channel 302 with an expanded cavity 304. Thus, the grooves 300 can slideably receive a component of the second attachment features 248 with a narrow neck and an expanded distal end. In other words, a component of the attachment feature 248 including a narrow neck and an expanded distal end can slide along one of the grooves 300 when the narrow neck is positioned within the narrow channel 302 and the expanded distal end is positioned within the expanded cavity 304. For example, in the illustrated embodiment, the second attachment feature 248 includes a pair of bolts 306 that pass through the second coupling section 242 and into the grooves 300. The bolts 306 are each coupled with separate plate features 310 or integral with plate features 310 that are slideably positioned within the expanded cavity 304 of the corresponding grooves 300. In other embodiments, the attachment feature 248 may include different types of fasteners, such as a bus clamp including a bolt with an expanded distal end. The sliding engagement between the second attachment feature 248 and the grooves 300 facilitates connection of the interconnect 206 with the drive bus 202 at any location without added hardware or support. The plate features 310 may be inserted into the corresponding grooves 300 at an end of the drive bus 202 or via openings 312 that are machined into each of the grooves 300. By positioning the bolts 306 and plates 310 within the grooves 300 in this manner, nuts 314 can be tightened onto each of the bolts 306 such that the plate features 310 are pulled against lips 320 of each groove 300 that extend toward the narrow channel 302 and over the expanded cavity 304. Thus, the second attachment feature 242 is securely fastened to the drive bus 202.

Multiple grooves 300 are employed to reduce moment of the interconnect 222 about the drive bus 202 and to facilitate uniform contact between the drive bus 202 and the second attachment feature 242. Indeed, in accordance with present embodiments, the torque present when the drive bus 202 is coupled with the interconnect 222 facilitates the provision of communicative contact between the drive bus 202 and the interconnect 222. It should be noted that while two grooves 300 are provided in the embodiment illustrated by FIG. 5, in other embodiments, additional grooves may be included. For example, each of the bus bars 200, 202 may be extruded with grooves 300 such that the bus bars 200, 202 are capable of making multiple connections to attachment features at essentially any location along the bus bars 200, 202.

The bus bars 200, 202 may also be extruded with ridges 400 that extend along the edges of the bus bars 200, 202. The ridges 400 may coordinate with support features to maintain stability of the bus bars 200, 202 within an enclosure. For example, turning back to FIGS. 3 and 4, the drive bus 202 is shown disposed within the molded brackets 210, which are formed (e.g., molded) from non-conductive material. The brackets 210 are configured to slidably receive the drive bus 202 into a receptacle disposed within each of the brackets 210 and to attach with an enclosure (e.g., the enclosure 100) or other support features, such as the support 213. As can be seen in FIG. 3, the support brackets 210 do not necessarily couple directly to the drive bus 202 but engage with cross-sectional features of the drive bus 202 to prevent rotation or movement in certain directions, while allowing the drive bus 202 to float laterally. Specifically, the brackets 210 include a main opening 402 with gaps 404 on either side that engage with the ridges 400 disposed along the sides of the drive bus 202. These ridges 400 and gaps 404 prevent rotation of the drive bus 202 about a lengthwise axis of the drive bus 202 while allowing it to essentially float laterally within the brackets 210. The brackets 210 also include expanded capacity to accommodate an expanded drive bus, as will be discussed in further detail below.

Figure 5:
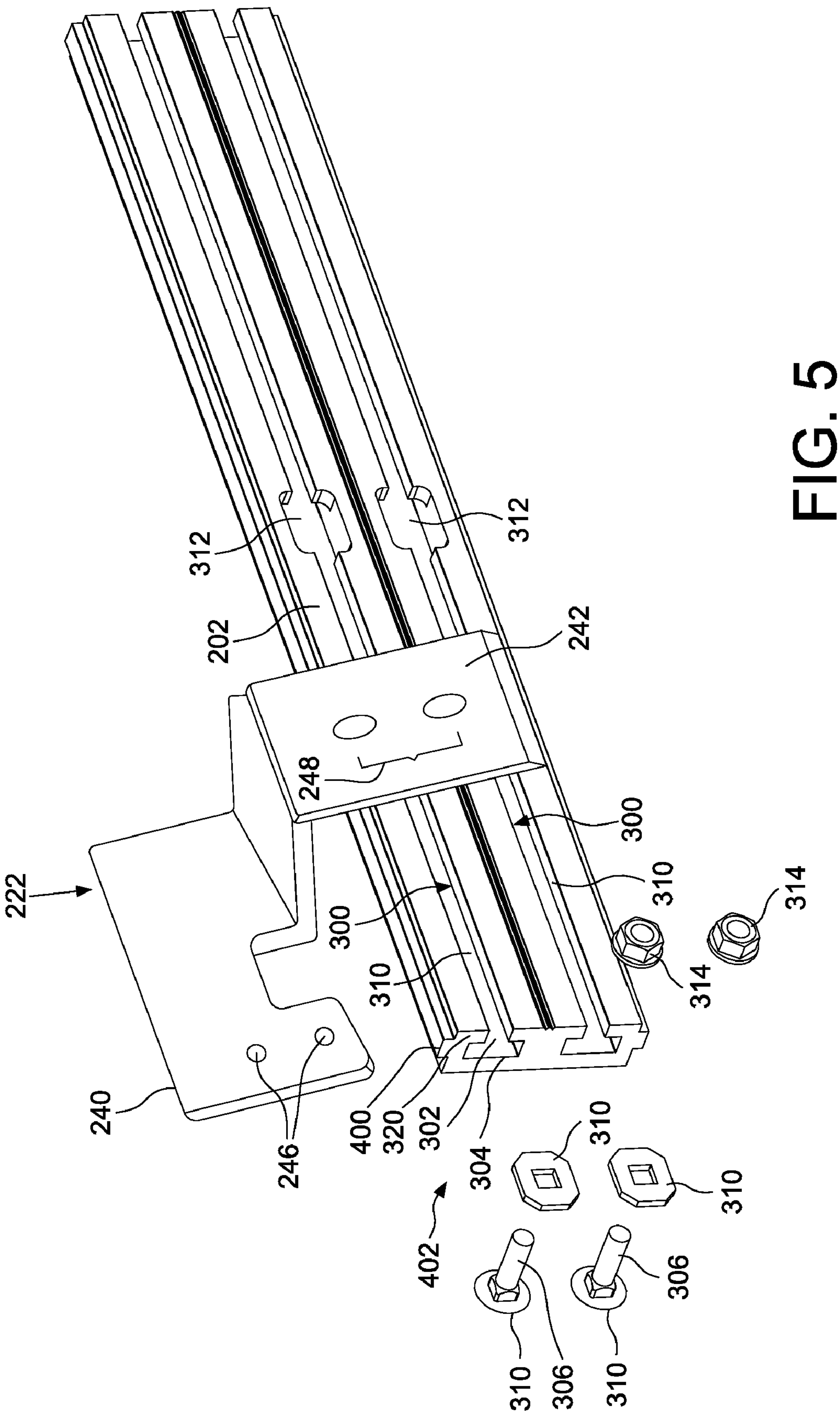
FIG. 5 is a perspective view of an interconnect coupled with a bus bar in accordance with present embodiments.
Figure 6:
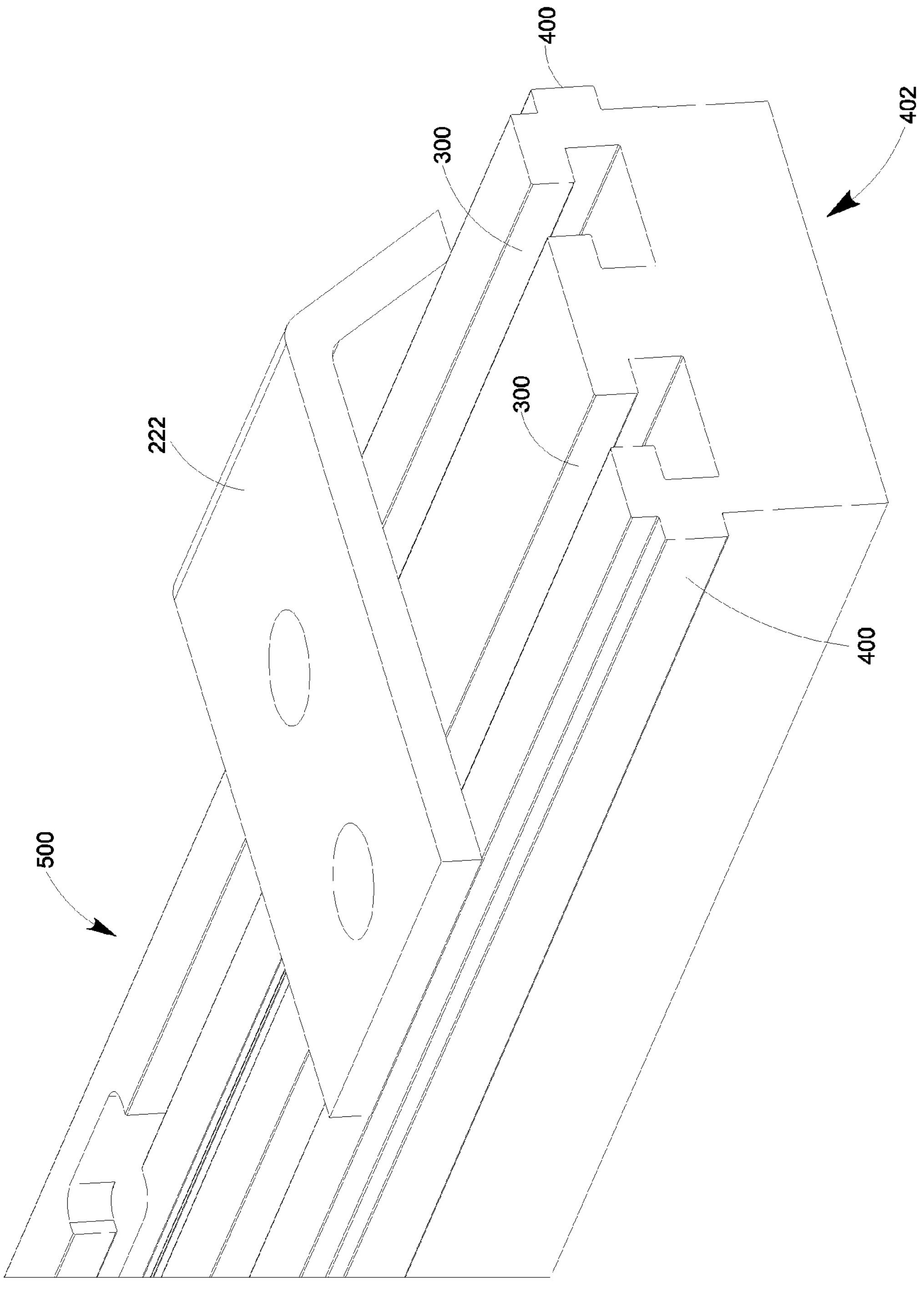
FIG. 6 is a perspective view of an interconnect coupled with a bus bar having an expanded rear portion to accommodate additional capacity in accordance with present embodiments.

As shown in FIG. 6, a rear portion 402 of a drive bus 500 may be expanded relative to the drive bus 202 illustrate in FIG. 5 to provide additional capacity while maintaining the same geometric relationship between the grooves 300 in the face and the ridges 400 along the sides of the drive buses 202, 500. For example, the drive bus 500 has an expanded capacity to transmit power compared to the drive bus 202. However, the expanded drive bus 500 and the drive bus 202 each have the same geometric relationships between the grooves 300 and ridges 400. By merely expanding the rear portion 402, the interaction between the brackets 210 the ridges 402, and the interaction between the grooves 300 and the second attachment feature 248 remain unchanged. Thus, the same jumper 222 can couple with either the drive bus 202 or the drive bus 500 in the same manner.

Figure 7:
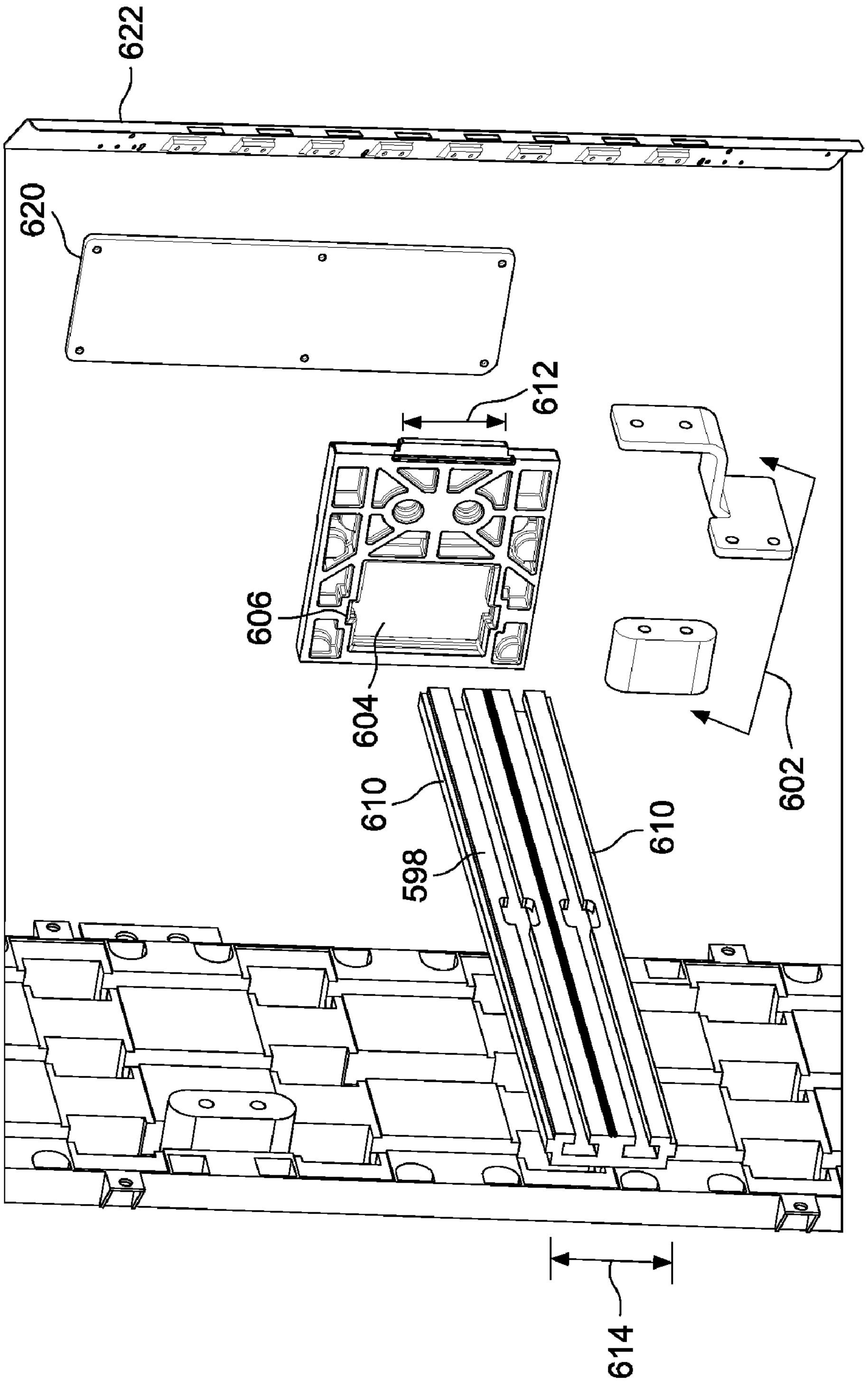
FIG. 7 is an exploded perspective view of a bus bar, a bracket, and an interconnect 602 in accordance with present embodiments.

FIG. 7 illustrates an exploded perspective view of a bus bar 598, a bracket 600, and an interconnect 602 in accordance with present embodiments. In the illustrated embodiment, the support bracket 600 comprises compression molded thermalset glass reinforced material that includes a main opening 604 with slots 606 on either side of the main opening 604. The slots 606 are sized to receive ridges 610 on either side of the bus bar 598. Further, the main opening 604 has a height 612 that corresponds to a height 614 of a central portion of the bus bar 598 (excluding the added height of the ridges 610). Accordingly, when the bus bar 598 is positioned within the support bracket 600, the ridges 610 engage the slots 606 and prevent substantial rotation of the bus bar 602 about its lengthwise axis or movement in a direction traverse to its lengthwise axis. However, the engagement between the support bracket 600 and the bus bar 598 does permit lateral movement such that the bus bar 598 essentially floats within the bracket 600 without being fastened to the bracket 600, which facilitates attachment of other features to the bus bar 598, such as the interconnect 602. It should be noted that lateral movement is limited in accordance with present embodiments by end caps 620 or the like that can be attached to the brackets 600 or by protective end pieces that are positioned on cabinet walls or other support features 622 adjacent the end of the bus bar 598. For example, an end cap may be fastened on to the bracket 600 via engagement features molded into the bracket 600. The end cap and/or protective end piece coupled to the support 622 may still provide some lateral leeway to facilitate coupling the interconnect 602 with the bus bar 598.

Figure 8:
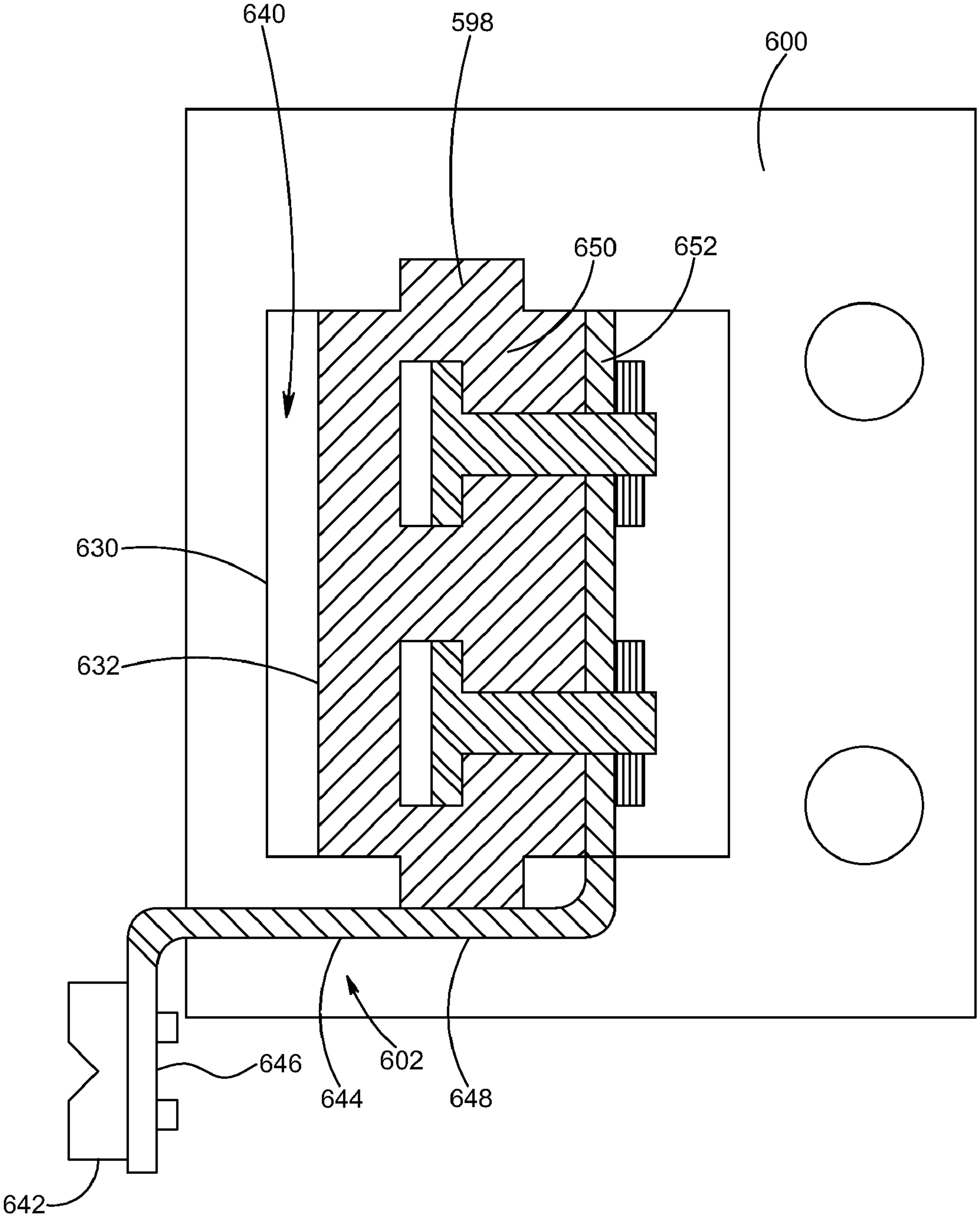
FIG. 8 is a cross-sectional view of a bus bar positioned within a bracket and coupled with an interconnect in accordance with present embodiments.

FIG. 8 is a cross-sectional view of the bus bar 598 positioned within the bracket 600 and coupled with the interconnect 602 in accordance with present embodiments. As shown in FIG. 8, the main opening 604 in the illustrated bracket 600 includes a certain amount of tolerance in width relative to the illustrated bus bar 598. For example, there is extra space provided between a vertical edge 630 of the bracket 600 and a rear face 632 of the bus bar 598, which may be referred to as rear space 640. This additional space, with respect to the illustrated embodiment, is provided to enable flexibility with respect to increasing the capacity of the bus bar 598. For example, as discussed above, a bus bar with added capacity relative to the illustrated bus bar may include an expanded rear section 402. Such an expanded rear section 402 can be accommodated by the rear space 640. Thus, a single bracket type can be manufactured to handle a wide variety of bus bars with differing capacities. This is cost efficient and reduces complexity. It should be noted that the interconnect 602 is designed to handle the features that enable added capacity of the bus bar 598. Indeed, as with embodiments discussed above, the interconnect 602 includes a via block 642 and a jumper 644. The jumper 644 includes a first coupling portion 646 configured to couple with the via block 642, a neck portion 648 configured to extend past a face 650 of the bus bar 598, and a second coupling portion 652 configured to attach with the bus bar 598. The via block 642 (which extends through a panel) and the jumper 644 are designed such that the second coupling portion 652 is positioned over the face 650 of the bus bar 598 to enable coupling. Thus, the neck portion 648 extends over a width of the bus bar 598. However, the neck portion 644 works in conjunction with other portions of the interconnect 602 to accommodate the offset from the panel provided by the bracket 600, including the extra space 640 within the bracket 600 that accommodates expansion.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A bus to bus interconnect system, comprising:

a via block having first and second interfaces separated by a conductive body, wherein the via block is configured to communicatively couple with a first bus through the first interface and wherein the conductive body is configured to extend through an opening in a bus support panel;

a first coupling section of a jumper including a first attachment feature, wherein the first attachment feature is configured to facilitate attachment with the second interface of the via block;

a neck section of the jumper extending perpendicularly from the first coupling section; and a second coupling section of the jumper extending from the neck section, wherein the second coupling section includes a second attachment feature configured to facilitate attachment with a second bus, and wherein the first coupling section and the second coupling section each extend away from the neck section in different directions.

2. The system of claim 1, wherein the first attachment feature is positioned to one side of the first coupling section.

3. The system of claim 2, wherein the neck section of the jumper is offset from the first attachment feature.

4. The system of claim 1, wherein the first coupling section and the second coupling section extend away from the neck section such that the jumper comprises a generally Z-shaped cross-section.

5. The system of claim 1, wherein the first attachment feature comprises a pair of bolt holes disposed near an edge of the first coupling section away from an interface between the first coupling section and the neck section.

6. The system of claim 1, wherein the first attachment feature comprises a pair of bolts integral with an area near an edge of the first coupling section away from an interface between the first coupling section and the neck section.

7. The system of claim 1, wherein the first coupling section and the second coupling section extend away from the neck section such that the first attachment feature is not obstructed by the second coupling section and the first attachment feature is accessible from a direction perpendicular to a face of the first coupling section.

8. The system of claim 1, wherein the jumper is formed from a single piece of flat metal.

9. The system of claim 8, wherein the jumper comprises stamped sheet metal.

10. The system of claim 1, wherein the second attachment feature comprises a plurality of openings that are arranged to align with a plurality of grooves disposed in the second bus.

11. The system of claim 1, wherein the via block comprises an obround cross-section.

12. The system of claim 1, wherein the first and second interfaces comprise substantially planar faces and attachment features that extend into and/or away from the via block.

13. The bus to bus interconnect of claim 1, wherein a length of the neck section corresponds to a thickness of the bus bar such that the neck section and the second coupling section are configured to cooperatively receive the second bus bar and align the second attachment feature with a corresponding attachment feature of the second bus bar.

14. A bus to bus interconnect system, comprising:

a first bus positioned adjacent a panel on a first side of the panel, wherein the first bus comprises a first connection feature;

a second bus aligned parallel to the first bus and positioned adjacent the panel on a second side of the panel that is opposite the first side, wherein the second bus comprises a second connection feature that is offset from the first connection feature by a distance in a direction traverse to the length of the first and second bus;

a via block having first and second interfaces separated by a conductive body, wherein the first interface is communicatively coupled with the first connection feature and wherein the body extends through an opening in the panel;

a jumper coupled to the second interface via a first bracket arm and a first fastener feature positioned through the first bracket arm;

a trunk portion of the jumper extending perpendicularly from an edge of the first bracket arm and along a width of the second bus;

a second bracket arm of the jumper extending from an edge of the trunk portion and along a face of the second bus, wherein the second bracket arm is coupled with the second bus via the second connection feature and a second fastener feature positioned through the second bracket arm.

15. The system of claim 14, wherein the first fastener feature is positioned along one side of the first bracket arm.

16. The system of claim 15, wherein the trunk portion of the jumper is offset from the first fastener feature.

17. The system of claim 14, wherein the first fastener feature comprises a bolt hole and/or a bolt.

18. The system of claim 14, wherein the second connection feature comprises a plurality of grooves disposed in the second bus that run along a length of the second bus.

19. A bus to bus interconnect method comprising:

transmitting current from a first bus through a via block that is coupled to the first bus and extends from the first bus through a panel to a jumper;

receiving the current into the jumper from the via block via a first bracket arm of the jumper and first attachment features that couple the first bracket arm to the via block;

transmitting the current from the first bracket arm to a second bracket arm of the jumper via a jumper neck of the jumper, wherein the jumper neck extends away from the first bracket arm adjacent a width of a second bus bar; and transmitting the current into the second bus bar via the second bracket arm and second attachment features that couple with the second bracket arm and interlock with grooves disposed in a face of the second bus bar.

20. The method of claim 19, comprising transmitting current out of the second bus bar and into a device via an attachment including extensions with a narrow neck and a broadened distal end that interlock with a narrow channel and broadened cavity of the grooves.

21. The method of claim 19, comprising transmitting the current to a device via an elongate L-shaped bracket comprising angled coupling pads disposed on distal ends of the elongate L-shaped bracket.

22. The method of claim 19, comprising providing AC current to a rectifier or DC current to a pre-charge device via the first bus or the second bus.

23. The method of claim 19, comprising receiving, at the first bus, three-phase AC current from a source into the first bus.

24. The method of claim 19, wherein transmitting the current into the second bus bar comprises transmitting the current into the face of the second bus bar, wherein the face of the second bus bar is facing away from the via block.

25. The system of claim 1, wherein the second attachment feature extends towards the first coupling feature and comprises an opening in the second coupling section or a projection from the first coupling feature.

* * * * *